Aug. 18, 1925.

R. F. DOWNEY 1,549,964

CIRCULAR PIE OR CAKE CUTTER

Filed April 12, 1924    2 Sheets-Sheet 1

Inventor:
Richard F. Downey

Aug. 18, 1925.

R. F. DOWNEY 1,549,964

CIRCULAR PIE OR CAKE CUTTER

Filed April 12, 1924   2 Sheets-Sheet 2

Inventor:
Richard F. Downey

Witness:
R. E. Weber

Patented Aug. 18, 1925.

1,549,964

UNITED STATES PATENT OFFICE.

RICHARD F. DOWNEY, OF MILWAUKEE, WISCONSIN, ASSIGNOR OF ONE-THIRD TO WILLIAM J. CARY, OF MILWAUKEE, WISCONSIN.

CIRCULAR PIE OR CAKE CUTTER.

Application filed April 12, 1924. Serial No. 706,184.

*To all whom it may concern:*

Be it known that I, RICHARD F. DOWNEY, a citizen of the United States, and resident of Milwaukee, in the county of Milwaukee and State of Wisconsin, have invented certain new and useful Improvements in Circular Pie or Cake Cutters; and I do hereby declare that the following is a full, clear, and exact description thereof.

This invention relates to an apparatus for use in cutting pies or cakes.

Objects of this invention are to provide a device which will insure the cutting of the pie or cake into a predetermined number of uniform parts or slices, which may be quickly adjusted to alter the number of slices or cuts, which may be most easily manipulated and adjusted to accommodate different sizes or styles of pies or cakes, which is provided with readily controlled means for detachably holding the pie or cake in position, and which is so made that it may be most readily kept in a sanitary condition.

Further objects are to provide an apparatus which, although accomplishing a number of desirable and relatively complicated functions, nevertheless, is of simple and sturdy construction and employs a minimum number of readily formed parts.

An embodiment of the invention is shown in the accompanying drawings, in which:—

Figure 5:
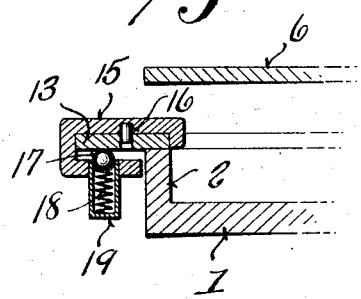
Figure 5 is an enlarged sectional view on the line 5—5 of Figure 1.

The device comprises a base portion 1 which is provided with an upstanding annular flange 2, and which may be provided with a plurality of downwardly projecting supporting legs 3. This base portion is provided with a central bearing 4 in which is journaled a central shaft 5. This shaft rigidly carries a rotary disk 6 which extends outwardly and may, if desired, rest upon the annular flange 2 of the base. The annular flange is provided with a relatively long slot or cut out portion 7 (see Figure 1), and with a smaller cut out or slotted portion 8 through which the advancing lever 9 and the releasing lever 10, respectively, pass. These levers, it will be noted, are pivotally mounted upon the central shaft 5 and are adapted to be rocked about such central shaft, a pair of springs 11 and 12 being provided for retracting the levers. The base portion is further provided with an arcuate gauge plate 13 provided with a plurality of graduations, and with a plurality of apertures 14 adjacent each of the graduations. Upon this gauge plate a movable stop 15 (see Figures 1 and 5) is positioned. This stop carries a pin 16 adapted to enter any of the apertures and is provided with a spring pressed plunger or ball 17 on its under side,—the spring 18 being conveniently socketed with a small downwardly extending sleeve 19. Thus when it is desired to set the stop all that is necessary is to press upwardly on the sleeve 19 to thus disconnect the pin 16 from engagement with the hole within which it had been set. Thereafter, the stop may be slid along the arcuate gauge plate to the desired graduation, and when the pressure is removed, the pin 16 will again seat in the appropriate aperture, thus locking the stop in position.

Figure 1:
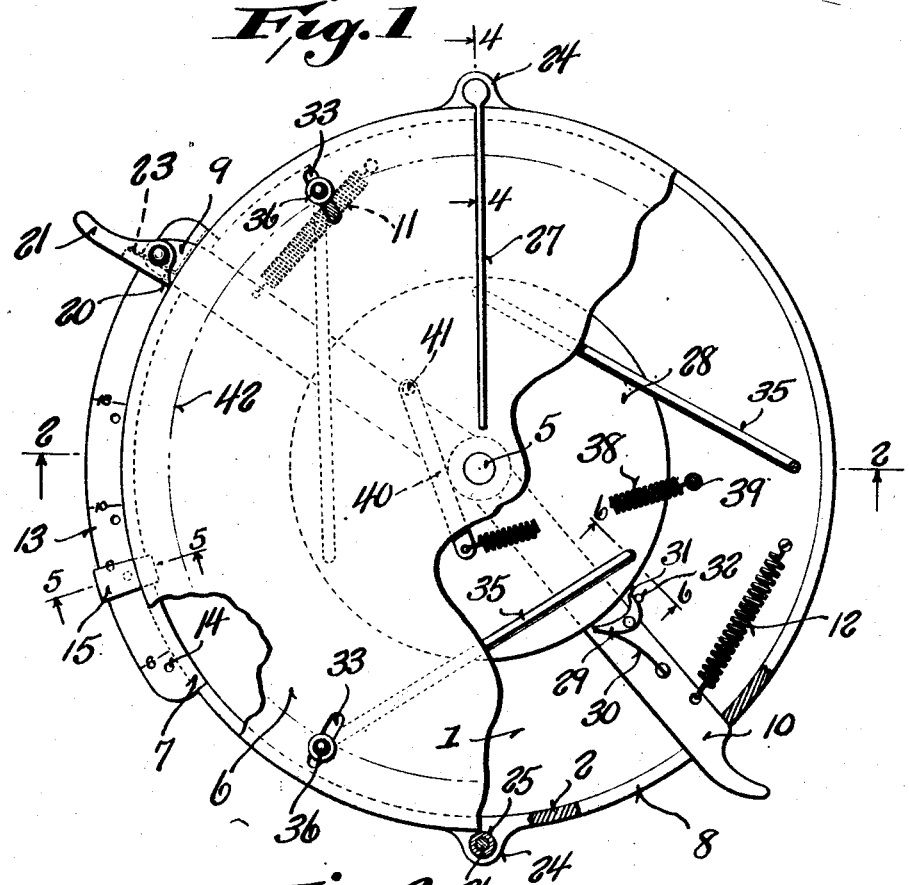
Figure 1 is a plan view of the device with parts broken away to show the interior construction.
Figure 3:
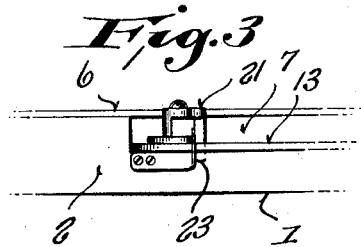
Figure 3 is a detail of the locking pawl for the advancing mechanism.
Figure 8:
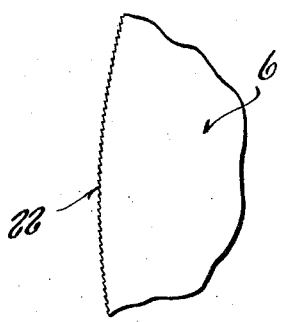
Figure 8 is an enlarged fragmentary view of a portion of the rotary disk.

The advancing lever 9 is provided with a pivotally mounted pawl 20 adjacent its outer end, as may be seen from Figure 1. This pawl is provided with an outwardly projecting thumb piece 21 adapted to be grasped by the operator when he desires to advance the plate 6. The pawl cooperates with a plurality of ratchet teeth 22 (see Figure 8) upon the periphery of the plate 6 and thus serves to temporarily lock the lever 9 to the plate 6 during advancing motion. It is to be noted that when the operator rocks the lever 9 against the action of the spring 11 that he automatically tilts the pawl so as to cause an even firmer engagement between the pawl and teeth 22. The lever 9 is pushed in a counterclockwise direction, as shown in Figure 1, until it engages the stop 15 and further motion is prevented. The graduations are so arranged on the gauge plate 13 that the exact number of slices may be read directly from the plate and the appropriate setting of the stop may thus be made. In order to maintain the pawl in engagement with the peripheral teeth 22 of the rotary disk 6, a small leaf spring 23 is secured to the flange 2 of the base, as shown in Figures 1 and 3, and is adapted to contact with the rear face of the pawl and to thus maintain it in engagement with the teeth 22 although the hand of the operator has been removed.

Figure 4:
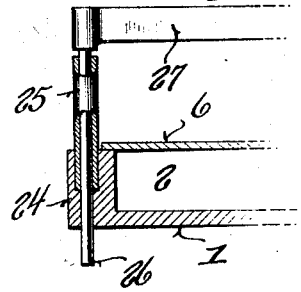
Figure 4 is a sectional view on the line 4—4 of Figure 1.

The base portion is provided with diametrically opposed thickened parts or ears 24 within which are positioned sleeves 25 (see Figure 4). These sleeves slidably carry vertical pins 26 which are secured to a cross head or guide 27,—the guide extending diametrically across the plate 6.

Figure 6:
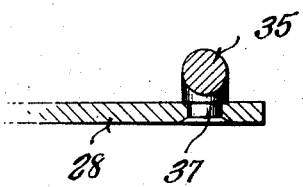
Figure 6 is an enlarged sectional view on the line 6—6 of Figure 1.
Figure 7:
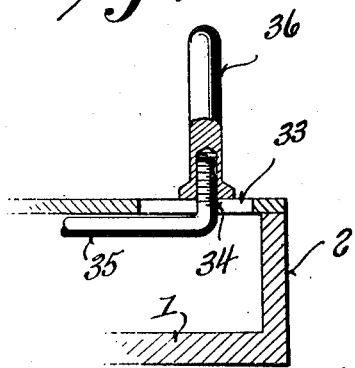
Figure 7 is a view of one of the clamping pins such view being partly in section.

Beneath the plate 6 a smaller rotary plate 28 is pivotally and loosely mounted upon the shaft 5. This plate or disk is also provided with peripheral teeth. A pawl 29 is pivotally mounted upon the lever 10 and is urged by means of the leaf spring 30 towards engagement with the teeth of the rotary disk 28. This pawl is provided with a right angle arm 31 which, when the lever is in its rearmost position, is engaged by a pin 32 carried by a stationary portion of the device. This rocks the pawl free of the teeth and allows interruption of the operative connection of the lever 10 and the disk 28 when such lever is in its rearmost position, as stated. The disk 6 is provided with three or more radial slots 33 through which the upturned ends 34 of rods 35 project, such upturned ends being threaded and received in suitably threaded apertures in the clamping pins 36 (see Figures 1 and 7.) The rods 35 are further provided at their other ends with downwardly extending portions which are of reduced size, as indicated at 37 in Figure 6, and these reduced ends are loosely fitted within apertures formed in the disk 28 and are preferably headed, as illustrated, to prevent their inadvertent withdrawal.

It will be seen, therefore, that motion of the disk 28 relatively to the disk 6 forces the clamping pins 36 outwardly when the disk 28 moves in a clockwise direction, and upon motion in the reverse direction, the pins are drawn inwardly. The disk 28 is urged in a counterclockwise direction with reference to the disk 6 by means of the spring 38, one end of which is fastened, as indicated at 39, to the under side of the disk 6, and the other end of which is fastened in any suitable manner to the disk 28 as, for instance, to one end of a lever 40 pivotally secured, as indicated at 41, to the disk 28.

Figure 2:
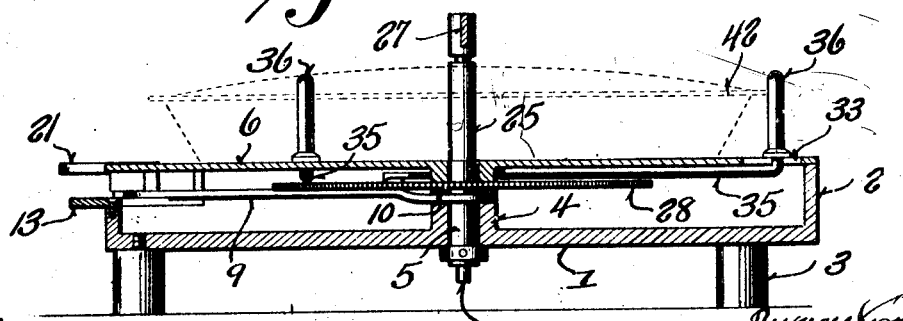
Figure 2 is a sectional view on the line 2—2 of Figure 1.

When it is desired to remove pie pan 42 (see Figure 2), it is merely necessary to pull the lever 10 in a clockwise direction. This causes the pawl 29 to move away from the pin 32 and to engage the teeth of the disk 28, thus rotating the disk 28 relatively to the disk 6,—such latter disk being held stationary by means of the pawl 20. As the lever 10 is rocked in a clockwise direction, the clamping pins 36 move radially outwardly and thus permit the free removal of the pie or cake. When, however, a new cake or pie is placed upon the disk 6, and the lever 10 released, the pins 36 will be drawn inwardly through the action of the spring 38, and the intermediate mechanism and will clamp the new material in position. The action of the pawl 29 does not in any manner interfere with the free advance of the disk 6, as such pawl is automatically disengaged from the teeth of the disk 28 when the lever 10 is in its rearmost position, as shown in Figure 1.

It is to be understood that knurling may be substituted for the definitely formed teeth upon the periphery of the disks 6 and 28.

When it is desired to cut a slice from the pie or cake, the lever 9 is advanced to rotate the disk 6, the desired amount. Thereafter, a knife is held against the guide 27 and the slice is cut, such slice being an accurate division of the pie.

It will thus be seen that an apparatus has been provided for use in cutting pies or cakes which may be most readily adjusted to receive and retain the pie, which may be quickly operated to advance the pie the requisite amount, and which may be easily kept in a sanitary condition.

The term pie will be used to also indicate any similar article such as cake, for instance, and the specific mention, of the word "pie" is, therefore, not to be understood as a limiting feature in the claims.

Although the invention has been described in considerable detail, it is to be understood that the invention may be variously embodied and is, therefore, to be limited only as claimed.

I claim:

1. A device for use in cutting pies comprising a revoluble member for receiving a pie, means carried by said member for holding said pie, a normally stationary lever for releasing said holding means, means for advancing said revoluble member in a step-by-step manner, and a knife guide mounted above said revoluble member.

2. A device for use in cutting pies comprising a base, a disk revolubly carried thereby, a lever pivotally mounted relatively to said base, a pawl carried by said lever for engaging the periphery of said disk, a second lever pivotally mounted relatively to said base, a plurality of pins projecting through said disk and resiliently urged inwardly along radial lines, mechanism normally detached from and adapted to be operated by said second lever for moving said pins outwardly, and a knife guide extending across and spaced from said disk.

3. A device for use in cutting pies comprising a base, a disk revolubly carried thereby, a lever pivotally mounted relatively to said base, a pawl carried by said lever for engaging the periphery of said disk, a gauge strip carried by said base and having graduations thereon indicating the number of slices to be cut, a stop adjustably mounted upon said gauge strip and adapted to be set at any graduation, and to limit the motion of said lever, a plurality of pins projecting upwardly through radially formed slots in said disk, a smaller disk mounted below said first mentioned disk, a plurality of rods connecting said smaller disk and said pins, resilient means interposed between said disks and tending to cause relative motion of such disks, a second lever pivotally mounted upon said base a pawl carried thereby and normally held in inoperative position and adapted to engage said smaller disk when said second lever is rocked, and a knife guide extending diametrically across and spaced from said first mentioned disk.

In testimony that I claim the foregoing I have hereunto set my hand at Milwaukee, in the county of Milwaukee and State of Wisconsin.

RICHARD F. DOWNEY.